(12) United States Patent
Gerber

(10) Patent No.: US 7,732,098 B2
(45) Date of Patent: *Jun. 8, 2010

(54) LEAD ACID BATTERY HAVING ULTRA-THIN TITANIUM GRIDS

(76) Inventor: Eliot Gerber, 127 Devin Dr., Moraga, CA (US) 94556

(*) Notice: Subject to any disclaimer, the term of this patent is extended or adjusted under 35 U.S.C. 154(b) by 0 days.

This patent is subject to a terminal disclaimer.

(21) Appl. No.: 12/313,090

(22) Filed: Nov. 17, 2008

(65) Prior Publication Data
US 2010/0009263 A1 Jan. 14, 2010

Related U.S. Application Data

(63) Continuation-in-part of application No. 12/218,154, filed on Jul. 11, 2008.

(51) Int. Cl.
H01M 4/68 (2006.01)
H01M 4/74 (2006.01)

(52) U.S. Cl. .................................. 429/242; 429/245

(58) Field of Classification Search ............... 429/242, 429/245
See application file for complete search history.

(56) References Cited

U.S. PATENT DOCUMENTS

| | | | |
|---|---|---|---|
| 2,713,079 A | 7/1955 | Carrick et al. | |
| 2,739,997 A | 3/1956 | Carrick et al. | |
| 3,486,940 A * | 12/1969 | Ruben | 429/245 X |
| 3,798,070 A * | 3/1974 | Ruben | 429/245 X |
| 3,870,563 A * | 3/1975 | Ruben | 429/245 X |
| 4,326,017 A * | 4/1982 | Will | 429/245 X |
| 4,554,228 A | 11/1985 | Kiessling | |
| 4,666,666 A | 5/1987 | Taki et al. | |
| 4,683,648 A | 8/1987 | Yeh | |
| 4,760,001 A | 7/1988 | Nann et al. | |
| RE33,133 E | 12/1989 | Kiessling | |
| 5,223,354 A | 6/1993 | Senoo et al. | |
| 5,238,647 A | 8/1993 | Mitsuyoshi et al. | |
| 5,339,873 A | 8/1994 | Feldstein | |
| 5,379,502 A | 1/1995 | Feldstein | |
| 5,411,821 A | 5/1995 | Feldstein | |
| 6,316,148 B1 | 11/2001 | Bhardwaj | |
| 6,334,913 B1 | 1/2002 | Yashiki et al. | |
| 6,979,513 B2 | 12/2005 | Kelley et al. | |
| 7,033,703 B2 | 4/2006 | Kelley et al. | |
| 2004/0151982 A1 * | 8/2004 | Shivashankar et al. | 429/245 X |
| 2006/0292448 A1 | 12/2006 | Gyenge et al. | |

OTHER PUBLICATIONS

U.S. Appl. No. 11/048,104, filed Feb. 2, 2005, Jung et al.
U.S. Appl. No. 11/279,103, filed Apr. 8, 2006, Jung et al.
Dai "Lead-plated titanium grids etc." 41 Power Sources Conference, Jun. 14-17 (2004).
Dai al. "Corrosion of lead Plate Titanium etc" (ref.on Google).
Kurisawa "Development of Positive Electrodes with Tin Oxide Coating by Applying a Sputtering Technique for Lead Acid Batteries." Journal Power Sources 1995 (2001) 1-5, 1-9, (Mar.).
Roos et al "Corrosion protection of aluminum surfaces using pyrolytic tin oxide" Appl.Phys.Lett 59(1)Jul. 1991.
Yolshina et al."A lead-film electrode on an aluminum substrate etc." Jour.of Power Sources 78, issues 1-2, Mar. 1999, 84-87.

* cited by examiner

Primary Examiner—Stephen J. Kalafut

(57) ABSTRACT

A lead acid electric storage battery uses conventional lead-acid secondary battery chemistry. The battery may be a sealed battery, an unsealed battery or a conventional multi-cell battery. The battery has a set of positive battery grids (plates) which are constructed with a body portion of thin titanium expanded metal having a thickness preferably in the range 0.1 mm to 0.9 mm and most preferably 0.2 mm to 0.4 mm. Typically the battery would have over 250 grids in a 12 inch long battery case.

12 Claims, 3 Drawing Sheets

LEAD ACID BATTERY HAVING ULTRA-THIN TITANIUM GRIDS

RELATED APPLICATION

This application is a continuation-in-part application partly based on application Ser. No. 12/218,154 filed Jul. 11, 2008.

FIELD OF THE INVENTION

The present invention relates to lead acid storage batteries, and more especially to the grids (plates) for such batteries.

BACKGROUND OF THE INVENTION

The need for improvements in lead-acid storage batteries is widely recognized. Hundreds of articles, patents and research projects have been directed toward improving such batteries. Some of the important characteristics that still need improvement are the cost of the grids (plates), pollution problems associated with the use of lead grids, battery power compared to size and weight, cold starting, mechanical ruggedness, quick charging, long life and multiple cycles (charge-discharge).

One example of a use in which a better battery may be important is in "plug-in hybrid" vehicles. A hybrid car such as a Prius (Toyota) may obtain up to 50 miles per gallon using the combination of a gas and electric motors. In a plug-in hybrid (PHEV—plug hybrid electric vehicles), a large battery is added to a hybrid car so that for the first 20 to 60 miles of driving each day the car becomes, in effect, a purely electric car. However, to be widely accepted, the battery pack for the PHEV should cost less than $3000, about one third the cost of a Li-Ion battery pack.

If a plug-in hybrid, using the batteries of the present invention, could drive 40 miles daily only on its battery, on average, its gas engine would not be used in daily driving. Such a typical car would not use any gasoline.

The plug-in hybrid may be recharged at low cost which may be reflected in electric billing. There is a great interest in such plug-in hybrid cars as they reduce air pollution, especially carbon dioxide, and reduce the need for petroleum imports, see Cal Cars.org and hybrid cars.com.

Professor Andrew Frank of the University of California Davis and his hybrid center have built about 16 plug-in hybrid cars and studied about 40 battery types in a Prius and hybrid SUV. The best batteries were lithium ion types which by themselves could propel the Prius about 60 miles. However a pack of the best batteries for each car would cost over $10,000. In contrast, the conventional lead acid batteries for the same car would cost under $1000. That price is much less than the lithium ion type of batteries. However conventional lead acid batteries propelled the Prius only 20 miles.

It has been suggested that the power of lead acid batteries may be increased by substituting lead plates with other materials. However, it is believed that almost all commercially available lead acid batteries use solid lead plates. There are now a number of projects that have been reported to use non-metal battery plates. Firefly Energy has announced it is developing carbon foam plates, see U.S. Pat. Nos. 979,513 and 7,033,703. Also, Jung et al have filed patent applications on carbon battery plates, see U.S. application Ser. Nos. 11/048,104 and 11/279,103.

One suggestion is to use lead plating on a core of another metal, such as aluminum, copper, steel or titanium. Some of the prior patents and articles about lead-plated cores, or otherwise relevant, are set forth below. All of these patents and articles, and others cited in this patent application, are included herein by reference. Lead is plated on copper in Senoo U.S. Pat. No. 5,223,354; Senoo U.S. Pat. No. 5,093,970; Nann U.S. Pat. No. 4,760,001 and Kiessling U.S. Pat. No. 4,554,228.

U.S. Pat. No. 4,683,648 to Yeh shows a titanium plate covered with lead. U.S. Pat. Nos. 5,379,502, 5,339,873, 5,544,681, and 5,411,821 disclose copper or steel or other materials as cores with titanium and lead layers. U.S. Pat. No. 6,316,148 to Bhardwaj discloses a battery using aluminum foil which is coated with lead. U.S. Pat. Nos. 2,739,997 and 2,713,079 to Carrick disclose aluminum plates electroplated with lead in an aqueous plating bath. U.S. Pat. No. Re: 33133 to Kiessling discloses a copper plate covered with lead.

The following articles may be considered relevant: Dai et al. "Lead-plated titanium grids etc." 41 Power Sources Conference, Jun. 14-17, 2004; Dai et al. "Corrosion of Lead Plate Titanium etc" (ref. on Google); Kurisawa "Development of Positive Electrodes with Tin Oxide Coating by Applying a Sputtering Technique for Lead Acid Batteries." Journal Power Sources 1995 (2001) 1-5, 1-9.; Roos et al "Corrosion protection of aluminum surfaces using pyrolytic tin oxide" Appl. Phys. Lett 59(1) July 1991; and Yolshina et al. "A lead-film electrode on an aluminum substrate etc." Jour. of Power Sources 78, issues 1-2, March 1999, 84-87.

SUMMARY OF THE INVENTION

In accordance with the present invention plates for lead acid storage batteries, either conventional sealed and unsealed lead acid batteries or bipolar lead acid batteries, consist of thin grids, not foil, of titanium. By thin grids is meant that the grid (plate) is stiff enough to be self-supporting, e.g. it supports itself if stood on one edge, as distinct from foil which is thinner and is not self-supporting. The thickness of the titanium core is 0.05 mm to 0.9 mm, preferably 0.15 mm to 0.5 mm, most preferably 0.2 mm to 0.4 mm and in any event less than 0.9 mm. Preferably the grid is formed using expanded metal technology. The titanium core is an alloy containing palladium or/and ruthenium cleaned and may be treated to form an titanium nitride coating or is coated with electroless nickel. Preferably the grids are formed from a titanium alloy containing less than 0.9 palladium and/or ruthenium. Most preferably the alloy contains 0.02% to 0.2% palladium. Preferably the finished plates are about 0.30 mm thick, may be processed by automated battery paste filling machines, and are the positive grids of the battery.

DETAILED DESCRIPTION OF THE INVENTION

Figure 1:
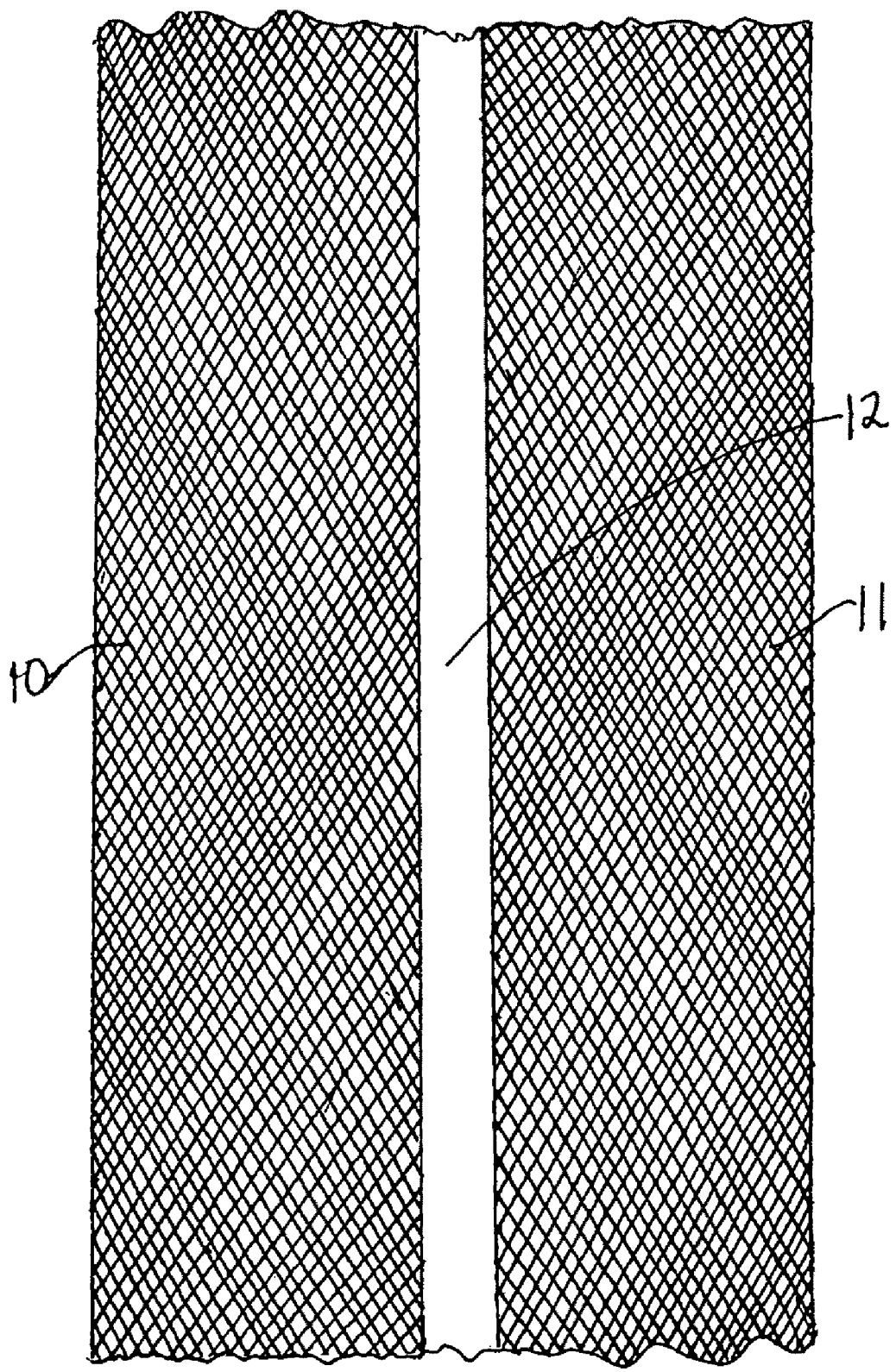
FIG. 1 is a top plan view of a group of grids before they are separated, as they come out of the expander machine.
Figure 2:
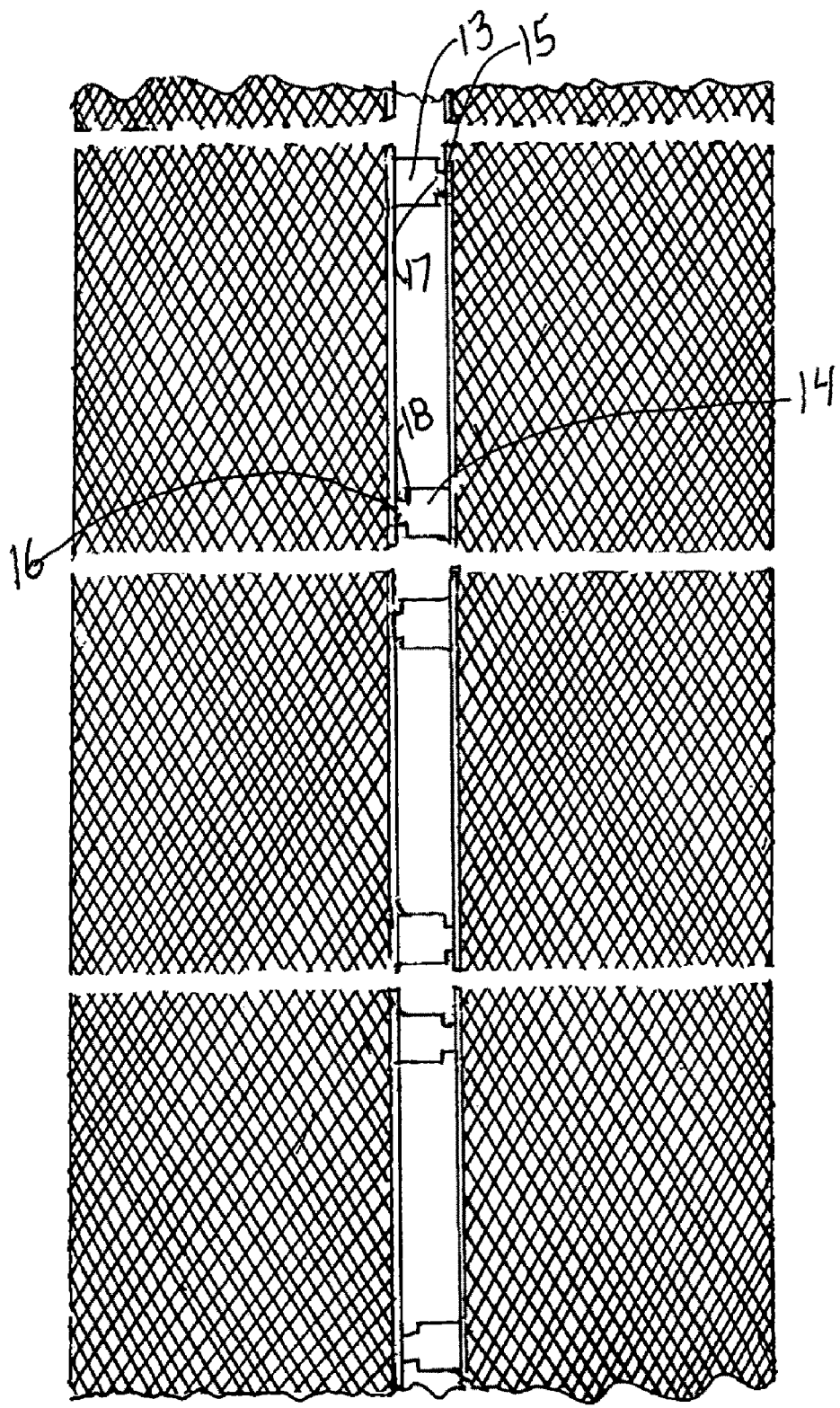
FIG. 2 is a top plan view of grids as they are stamped and as they enter the processing tanks.
Figure 3:
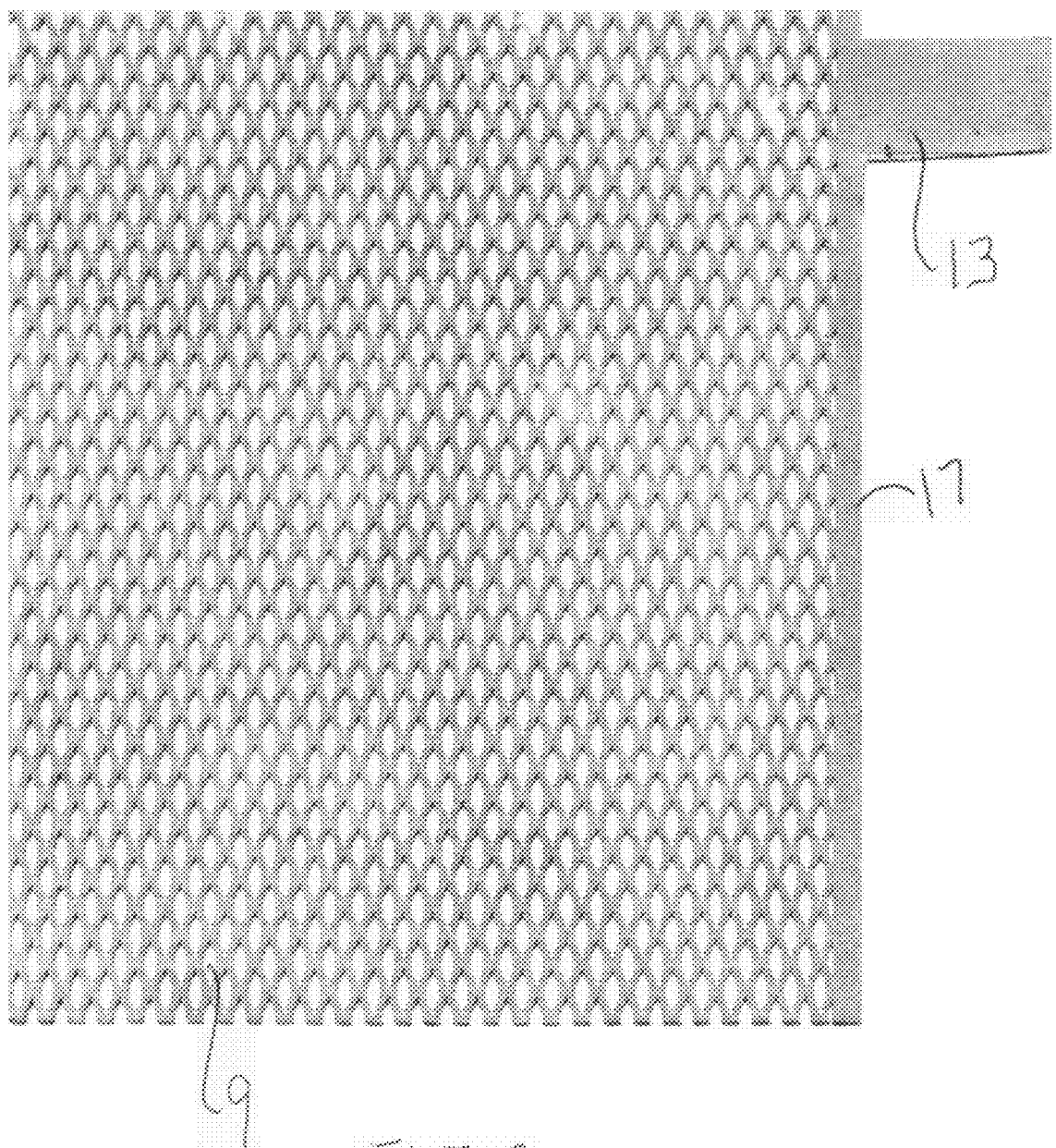
FIG. 3 is a top plan view of a grid of the present invention.

The grid 10 of FIGS. 1, 2 and 3 is formed from a titanium thin sheet (thin coil). Its thickness is in the preferred range of 0.05 mm to 0.9 mm and most preferably 0.15 mm to 0.5 mm and in any event, less than 0.9 mm. Preferably the thickness of the plate is about 0.2-0.4 mm. The grids may be thin, for example, as thin as the thickness of the side wall of an aluminum beverage can which has a thickness of about 0.1 to 0.2 mm. Titanium has good electrical conductivity compared to lead; it is stronger than lead; it is lighter than lead; however it is not completely corrosion resistant to the dilute sulfuric acid ("battery acid") used in lead acid batteries. "Expanded" means perforated and expanded metal.

The grids are preferably formed from a titanium alloy containing between 0.9% and 0.009% of either ruthenium or palladium or both ruthenium and palladium. The preferred range in the titanium alloy is 0.2% to 0.01% of palladium or ruthenium or both, most preferably 0.2% to 0.02%. The titanium grids, after forming and cleaning may be coated with a protective coating. The preferred coatings are titanium nitride and and/or tin oxide and a less preferred coating is electroless nickel with PTFE (polytetrafluoroethylene-20 to 25%).

In one embodiment of the present invention the positive grids have titanium cores and the negative grids are aluminum or copper grids.

An aluminum core having a preferred thickness of 0.2 mm to 0.5 mm. is inexpensive. The aluminum, titanium or copper grids may, optionally, be treated to form a complete coating thereon of tin dioxide, using sol-gel dip technology. Tin dioxide, $SnO_2$, also called stannic oxide, is an oxide of tin, with tin in oxidation state +4. The naturally occurring mineral is called cassiterite. The following is a report on a method of coating titanium cores with tin dioxide. The coating thickness is in the preferred range of 0.5 microns to 10 microns and most preferably in the range 0.5 to 2.0 microns, for example 1 micron.

The cleaning procedure is to soak the grid cores in the following liquids for 10 minutes in each liquid: 1. acetone or acetal acetate, 2. water and detergent with ultrasonic, 3. tap water with ultrasonic, 4. deionized water with ultrasonic, 5. distilled water with ultrasonic, and 6. isopropyl alcohol. In the case of aluminum cores, aluminum oxide on the surface of the grids may be then removed by cadmium conversion, if the next coating is a paint. For example, a non-chrome conversion called Iridite NCP is available from MacDermid. However, if the aluminum coating is electroless nickel the oxide is removed by a double zincate process, for example Metex zincate 6811 from Gallade Chemical.

One preferred method of obtaining a conductive fluoropolymer coating is to dip the grids, or spray the grids, twice with a fluoropolymer paint PTFE (10-30%) and nickel flake (90-70%) for a 1 micron thick coating, the range being 0.5 to 5 microns. A suitable paint is SKU-20043 from Shield Products, FL. made under U.S. Pat. No. 5,106,894. A suitable nickel flake product is Inco-Novamet HCA-1, the flakes being about 1 micro thick and conductive.

An alternative method is to deposit a NI-PTFE (nickel-Telflon DuPont™) coating of 0.5-10 microns, preferably 1-2 microns, from an aqueous solution by electroless nickel plating techniques. Prepared Ni-PTFE solutions are available from Sirius Technology company (Millenium TCN-8 or TCN-10) or from Ethone-Cookson Electronics (Endplate 845 with 20-25% PTFE)

A fluoropolymer is a polymer that contains atoms of fluorine. It is characterized by a high resistance to solvents, acids, and bases. Examples of fluoropolymers are: PTFE (polytetrafluoroethylene), PFA (perfluoroalkoxy polymer resin), FEP (fluorinated ethylene-propylene), ETFE polyethylenetetrafluoroethylene; PVF polyvinylfluoride ECTFE polyethylenechlorotrifluoroethylene; PVDF polyvinylidene fluoride; PCTFE, CTFE polychlorotrifluoroethylene; FFKM; FFKM; FPM/FKM.

The fluoropolymer is electrically conductive. Its conductivity is in the same range as metal. A less expensive alternative is to fill a fluoropolymer with graphite or/and lamp black. However that product may not be fully satisfactory for the grids as it is only semi-conductive, and not conductive. The EN-PTFE and PTFE paint may be used on positive and negative grids. However tin oxide may be used only on positive grids.

Example 1

Power Battery with 288 Grids

This battery has about the same size and weight as some present auto batteries (DIN 56311) but has 4 times the power/energy. The cost of copper of the negative grids would be about $12, which is more than the cost of lead grids in a 72 grid auto battery. But that auto battery has less energy/power because it has fewer grids. The grids can be arranged into 24 cells of 10 grids per cell to give a voltage of 48 volts. The size should be the same as an auto battery, for example if the separators are 0.4 mm thick and the paste thin (0.2 mm) each group of grid, separator and paste would be 1.0 mm×240=9.5 in. This type of power battery should be able to replace, for example the B&B Battery EVP20-12 used by Dr. Frank in a Prius PHEV. The B&B. Battery EVP20-12 uses grids 6.6 cm×15.6 cm=103 sq.cm×48=4944 sq.cm.(estimate). The grids of this Example 1 are 14.0 cm×11.5 cm=161 sq.cm× 240=38,640 sq.cm.(estimate). He used 15 batteries which added 209 lbs and provided 19.5 miles. Three batteries of the present invention should cost less than $3000, weight less than 200 pounds, occupy less than 1.5 cu.ft in volume and propel a Prius over 40 miles. This should make plug-in hybrid cars less expensive, over 2 years of usage, than gasoline and diesel cars, because generally they would not use any petroleum fuel.

The term used herein of an "aluminum oxide film removal metallic layer" means a layer of a metal material which removes the film of of air or oxygen. This "removal layer" forms a micron range thin layer of a metallic material. A preferred layer of this type is formed by immersion of the cleaned aluminum grids is a zincate solution. A suitable zincate solution is: 3 quarts distilled water and 1 quart of zincate concentrate from Caswell (www.caswellplating.com). An alternative zincate solution is: sodium hydroxide 440 gms/ liter; zinc oxide 87 gms/liter; and immersion time 10-30 seconds. An alternative is a stannate. The term "tin dioxide", as used herein, includes the various names and forms of tin dioxide including tin oxide, stannous oxide, stannic oxide, and includes various dopants and includes other layers, such as a layer of tin over the tin dioxide and under the lead layer. The dopant or combination of dopants should be such as to be effective to improve the electric conductivity (reduce the resistivity) of the tin oxide coating on the substrate. The preferred dopant for tin dioxide coating is selected from the group consisting of fluoride ion, antimony ion and mixtures thereof. Fluoride ion is particularly preferred since it is especially tolerant of the aggressive environment in a lead-acid battery.

As shown in FIGS. 1-2 the core aluminum, copper or titanium grids are formed in a metal expander machine and flattened by being pressed between rollers to form flattened expanded metal. As shown in FIG. 1, body portions 9 (12 cm. wide) are formed from strips 10, 11 with a solid strip 12 of 2 cm. The lugs 13,14 are 1.5 cm high and are cut at their protrusions 15,16. The raw edge of the protrusions, after cutting and assembly in a battery, are within a lead bar and need not be treated. However, the small edge 17,18 should be corrosion protected, for example by being coated with nonconductive fluoropolymer paint.

Preferably the grids are lead-free. A thin coating of lead over-coating may be used, less than 100 microns thick, or the over-coat of lead may be omitted and a thin layer, preferable 1 to 5 microns thick, of tin or nickel may be plated over the conductive fluoropolymer, tin oxide or titanium nitride (titanium) layer. Alternatively, the fluoropolymer layer or titanium nitride or tin oxide layer may be left uncoated so that it becomes the outer later of the composite grid.

In accordance with the present invention, there is provided a lead-acid battery having a plurality of positive and negative battery grids, the polarity of the grids is determined by charging the battery after the grids are pasted and the battery assembled. At least some of the positive grids are lead-free titanium grids having an expanded metal body portion. They have a thickness of less than 1 mm and are not a foil. Each of the titanium grids forms a plane having an imaginary line perpendicular thereto. The battery has at least 5 of the positive titanium grids aligned along 1 inch (25.4 mm) of said imaginary line and perpendicular thereto. Preferably a battery 12 inches long would have 288 grids, compared to 72 grids in a conventional auto battery Preferably the titanium grid is a formed from a titanium alloy containing a metal in less than 0.9% selected from the group of palladium, ruthenium or palladium and ruthenium. Most preferably the metal is palladium in less than 0.25% of the alloy, for example 0.2%. Grades 7 & 16 of titanium alloy have 0.15-0.25% palladium, grades 16 & 17 have 0.04-0.08% palladium ("lean palladium") and grades 26 & 27 are 0.08-0.14% ruthenium. US patents relating to titanium alloys containing palladium include U.S. Pat. Nos. 6,334,913; 4,666,666 and 5,238,647. Titanium can be corrosion inhibited by surfactants, such as "tween" and other chemicals.

Various embodiments use a plurality of negative copper or aluminum core expanded metal body battery grids, each negative grid being a self supporting grid and not a foil. The composite aluminum battery grids are composed of an aluminum core and a thin protective coating of electrically conductive fluoropolmer plastic or EN-PTFE over an oxide removal layer.

An preferred negative grid is composed of copper or copper alloy including at least 80% copper (hereafter "copper grid"), such as "cupro-nickel" (UNS 70600) cu 90% and ni 10%.

The battery of the present invention, like the conventional lead-acid battery, is a multi-cell structure. Each cell comprises a set of vertical positive and negative flat plates formed of grids containing layers of electrochemically active pastes. The paste on the positive plate when charged comprises lead dioxide, which is the positive acting material. A non-conductive separator and an acid electrolyte, based on sulfuric acid, is interposed between the positive and negative plates.

However, unlike conventional lead acid batteries:
1. the grids have an expanded metal body and are thin, less than 0.9 mm in thickness;
2. the grids are not of lead and preferably are not coated with lead;
3. the positive grids are of a titanium alloy, preferably with less than 0.9% palladium or ruthenium.
4. the negative grids are copper grids less than 0.8 mm thick. or aluminum coated with electroless nickel and PTFE and less than 0.8 mm thick.

What is claimed is:
1. A lead-acid battery having a plurality of positive and negative battery grids with separators therebetween:
  (a) at least some of said positive grids being a lead-free titanium alloy having 0.009% to 0.9% selected from the group of palladium, ruthenium and palladium with ruthenium;
  (b) said titanium alloy grids having an expanded metal body portion and said grids having a thickness of less than 1 mm and not being a foil;
  (c) said negative grids having an expanded metal body portion having a thickness of less than 0.8 mm and not being a foil
  (d) said titanium and negative grids each forming a plane having an imaginary line perpendicular thereto, said battery having at least 10 of said grids perpendicularly aligned along 1 inch (25.4 mm) of said imaginary line.

2. A lead-acid battery as in claim 1 and including a thin protective coating of an electrically conductive titanium nitride over each titanium alloy grid, the protective coating having a thickness of less than 0.1 mm.

3. A lead-acid battery as in claim 1 and including a protective coating of tin oxide covering each titanium alloy grid.

4. A lead-acid battery as in claim 1 and including a protective coating of electroless nickel covering each titanium grid.

5. A lead-acid battery as in claim 1 wherein the titanium alloy contains 0.2% to 0.02% selected from the group of palladium, ruthenium and palladium and ruthenium.

6. A lead-acid battery as in claim 1 and also including having a plurality of aluminum core battery grids of expanded metal in a thickness of less than 0.8 mm and not a foil;
  said aluminum grids having a thin protective covering coating of electrically conductive flouropolymer, the protective coating having a thickness of less than 100 microns.

7. A lead-acid battery as in claim 6 having a plurality of battery grids, and, on the aluminum grids, a coating of lead of 20-100 microns covering said protective coating.

8. A lead-acid battery as in claim 1 wherein said negative grids are of expanded copper.

9. A lead-acid battery as in claim 1 wherein said positive grids have a lead over-coating.

10. A lead-acid battery having a plurality of positive and negative battery grids with separators therebetween:
  (a) at least some of said positive grids being lead-free titanium grids;
  (b) said titanium grids having an expanded metal body portion and said grids having a thickness of less than 0.9 mm and not being a foil;
  (c) each of said titanium grids forming a plane having an imaginary line perpendicular thereto, said battery having at least 5 of said positive titanium grids perpendicularly aligned along 1 inch (25.4 mm) of said imaginary line;
  wherein the titanium is a titanium alloy containing 0.4% to 0.01% selected from the group of palladium, ruthenium and palladium and ruthenium.

11. A lead-acid battery having a plurality of positive and negative battery grids with separators therebetween:
  (a) at least some of said positive grids being lead-free titanium grids;
  (b) said titanium grids having an expanded metal body portion and said grids having a thickness of less than 0.9 mm and not being a foil;

(c) each of said titanium grids forming a plane having an imaginary line perpendicular thereto, said battery having at least 5 of said positive titanium grids perpendicularly aligned along 1 inch (25.4 mm) of said imaginary line; said battery including a plurality of aluminum core battery grids of expanded metal in a thickness of less than 0.9 mm and not a foil;

said aluminum grids having a thin protective covering coating of electrically conductive flouropolymer, the protective coating having a thickness of less than 100 microns.

12. A lead-acid battery as in claim 11 having a plurality of battery grids, and, on the aluminum grids, a coating of lead of 20-100 microns covering said protective coating.

* * * * *